United States Patent [19]

Cheng

[11] Patent Number: 4,893,550

[45] Date of Patent: Jan. 16, 1990

[54] DYNAMIC VENT FOR AUTOMOBILES

[76] Inventor: Bin-Luh Cheng, 2332 Hampshire Way, Tallahassee, Fla. 32308

[21] Appl. No.: 252,599

[22] Filed: Oct. 3, 1988

[51] Int. Cl.$^4$ .............................................. B60H 1/26
[52] U.S. Cl. ...................................... 98/2.02; 98/2.12; 98/2.13; 98/2.18
[58] Field of Search .................. 98/2, 2.01, 2.02, 2.12, 98/2.13, 2.18, 94.1, 116; 160/105, 370.2

[56] References Cited

U.S. PATENT DOCUMENTS

| | | | |
|---|---|---|---|
| 1,933,478 | 10/1933 | Karns | 98/2.13 |
| 1,967,504 | 7/1934 | Gaughran et al. | 98/2.13 |
| 2,008,965 | 7/1935 | Miller | 98/94.1 |
| 2,557,442 | 6/1951 | Kurilo | 98/2.13 |
| 2,612,830 | 10/1952 | Kendrick | 98/2.02 |
| 2,628,549 | 2/1953 | Stelmach | 98/2.12 |
| 2,715,866 | 8/1955 | Mousel | 98/2.13 |
| 2,841,069 | 7/1958 | Ginzburg | 98/2.13 |
| 2,935,924 | 5/1960 | Holt | 98/2.13 |
| 2,949,842 | 8/1960 | Crandall | 98/2.13 |
| 3,057,283 | 10/1962 | Mashburn | 98/2.13 X |
| 3,659,516 | 10/1969 | MacDonald | 98/2.12 |
| 3,730,070 | 5/1973 | Pedersen | 98/2.04 |
| 3,917,433 | 11/1975 | Tomitaka | 98/116 X |
| 4,103,597 | 8/1978 | Williams | 98/2.12 |
| 4,463,790 | 9/1982 | Clapsaddle | 160/105 |
| 4,702,157 | 10/1987 | Comparon | 98/94.1 X |

FOREIGN PATENT DOCUMENTS

| | | | |
|---|---|---|---|
| 33012 | 2/1982 | Japan | 98/2.02 |
| 97511 | 6/1983 | Japan | 98/2.02 |
| 3624291 | 1/1988 | Japan | 98/2.13 |

Primary Examiner—Harold Joyce
Attorney, Agent, or Firm—Milton S. Gerstein

[57] ABSTRACT

An automobile window ventilator in which a fan is mounted to the window via panels. The fan causes the forced exchange of hot interior air with cooler ambient air, which fan is used especially in the parked state of the vehicle. The fan is powered from the d.c. voltage source of the vehicle, and is readily convertible to a swiveling cooling fan for cooling persons in the interior of the vehicle via an adapting structure. The panels snugly receive the window pane therebetween, which panels are held in place in the channels of the window frame via L-shaped clips. The control of the fan is automatic via a thermal switch sensing the interior temperature of the vehicle. The upper panel may be used for mounting a conventional static vent screen. A closure lid for closing off or exposing the dynamic vent is provided, which is adjustably positionable from the interior of the vehicle. An anti-tampering screen mesh denies unwanted access to the interior of the vehicle via the window mounting the dynamic vent.

20 Claims, 11 Drawing Sheets

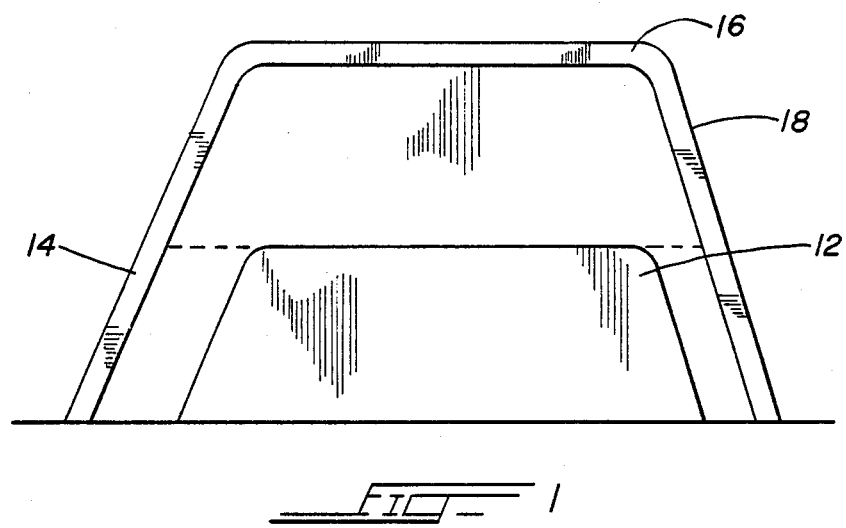
FIG. 1
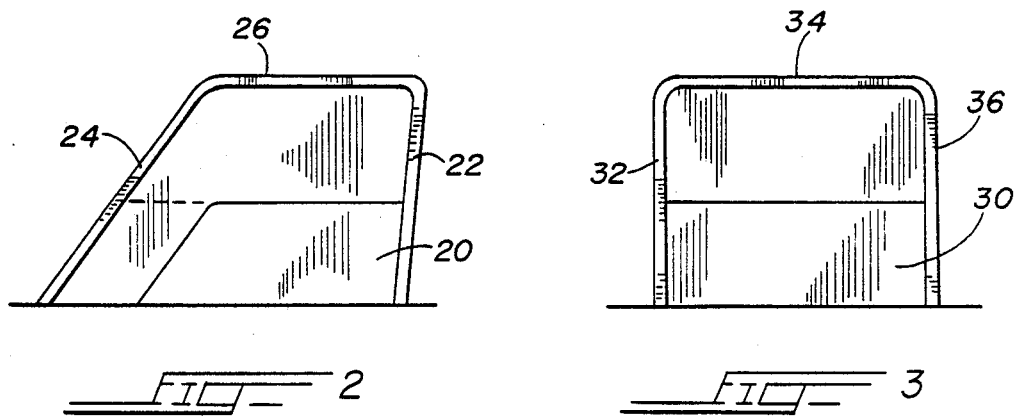
FIG. 2
FIG. 3

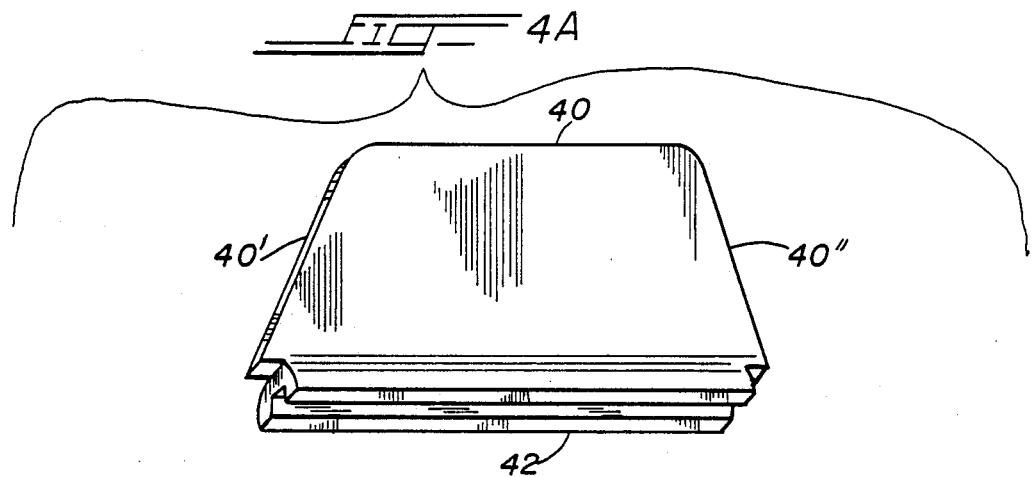
FIG. 4A
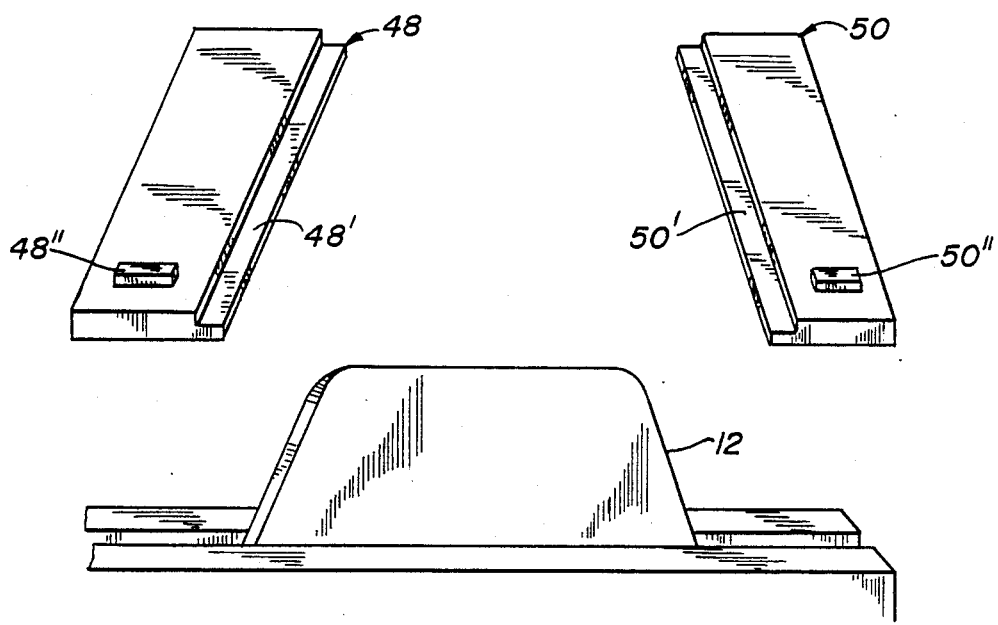

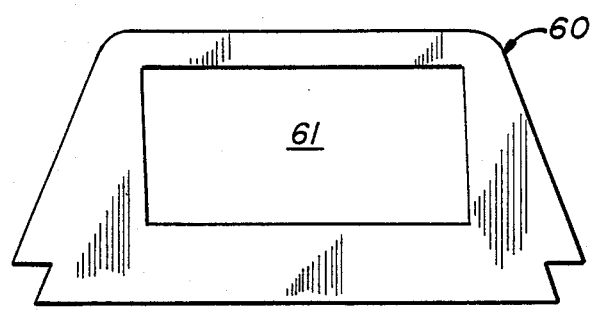
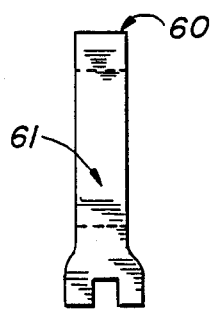
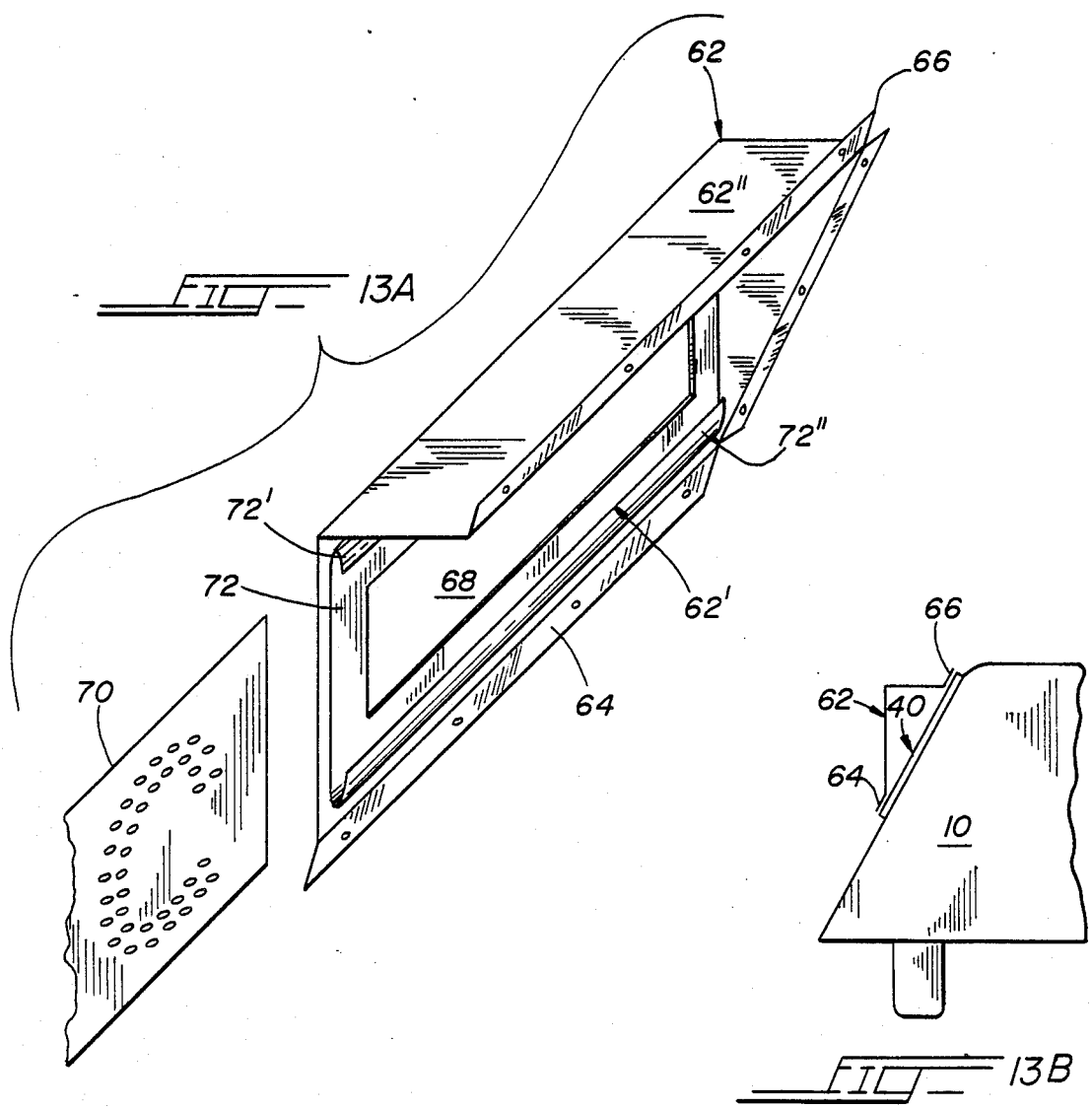
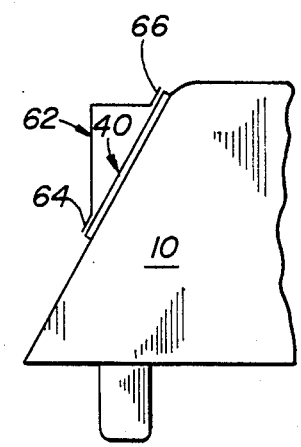

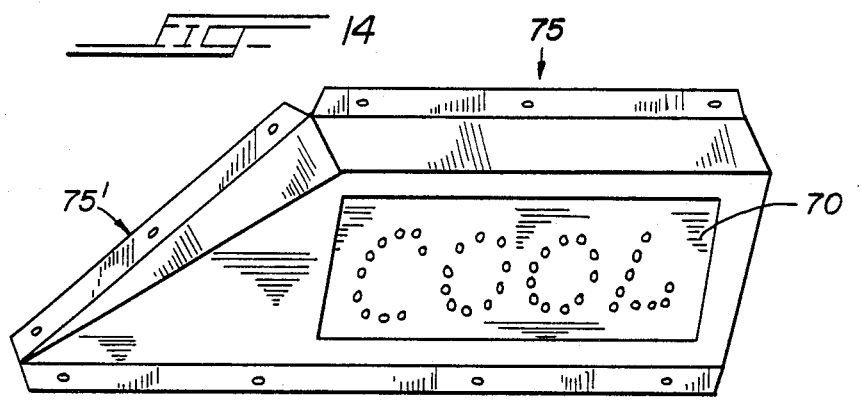
FIG. 14
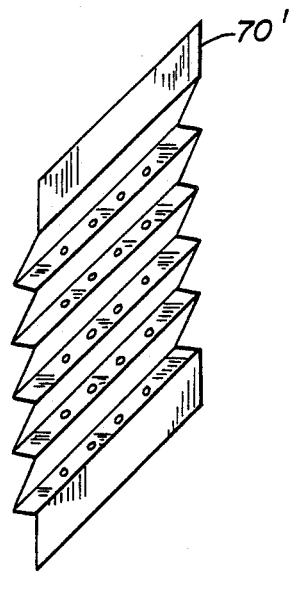
FIG. 15B
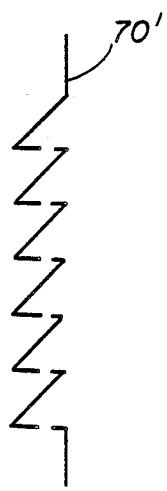
FIG. 16B
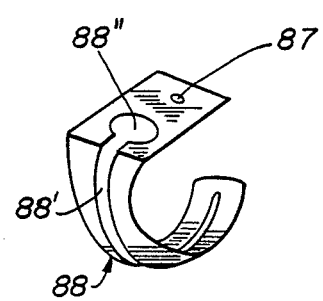
FIG. 17E
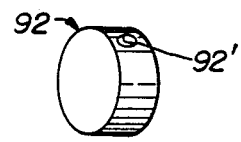
FIG. 17F

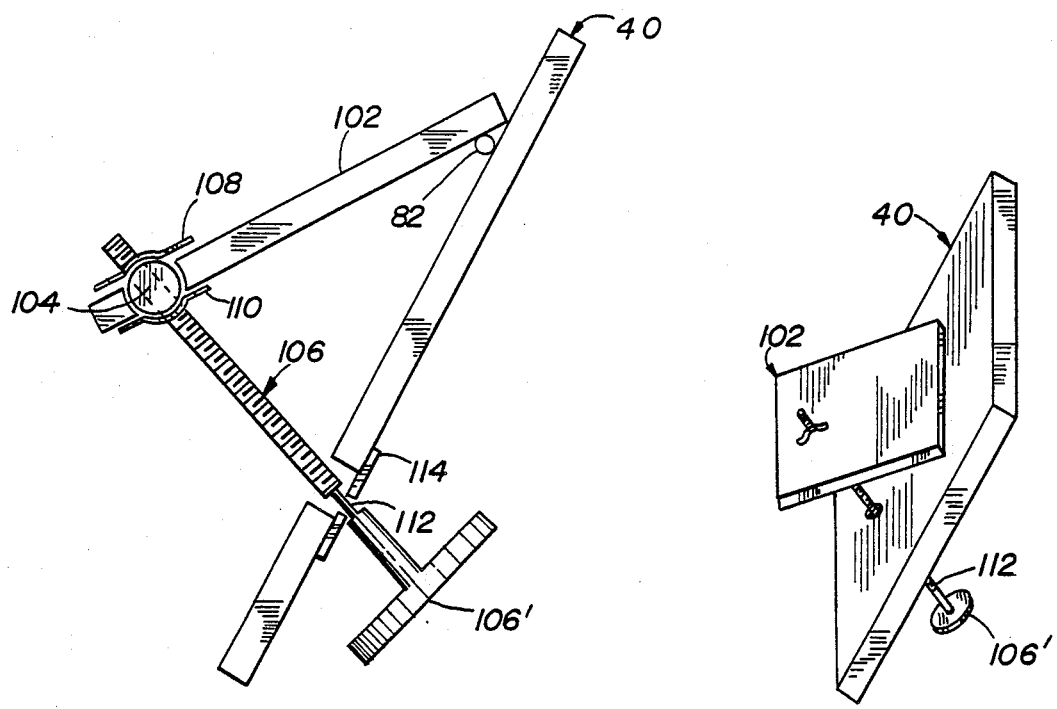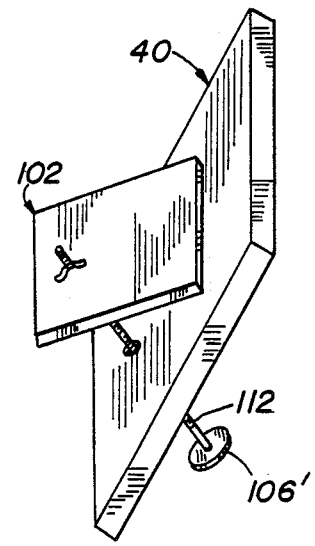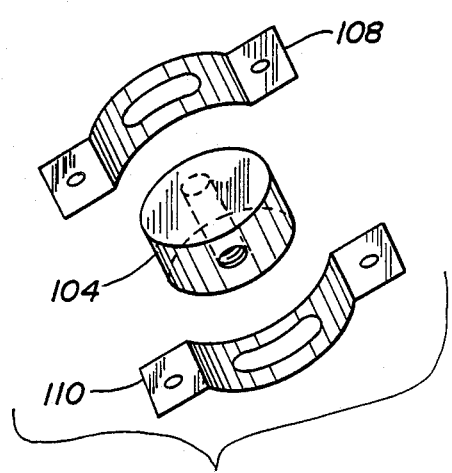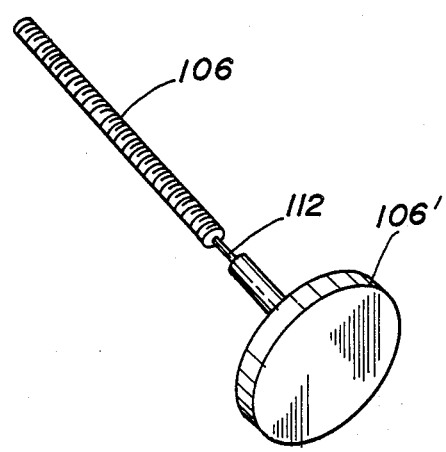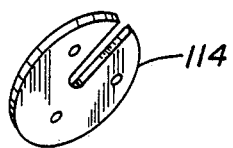
FIG. 18A
FIG. 18B
FIG. 18C
FIG. 18D
FIG. 18E

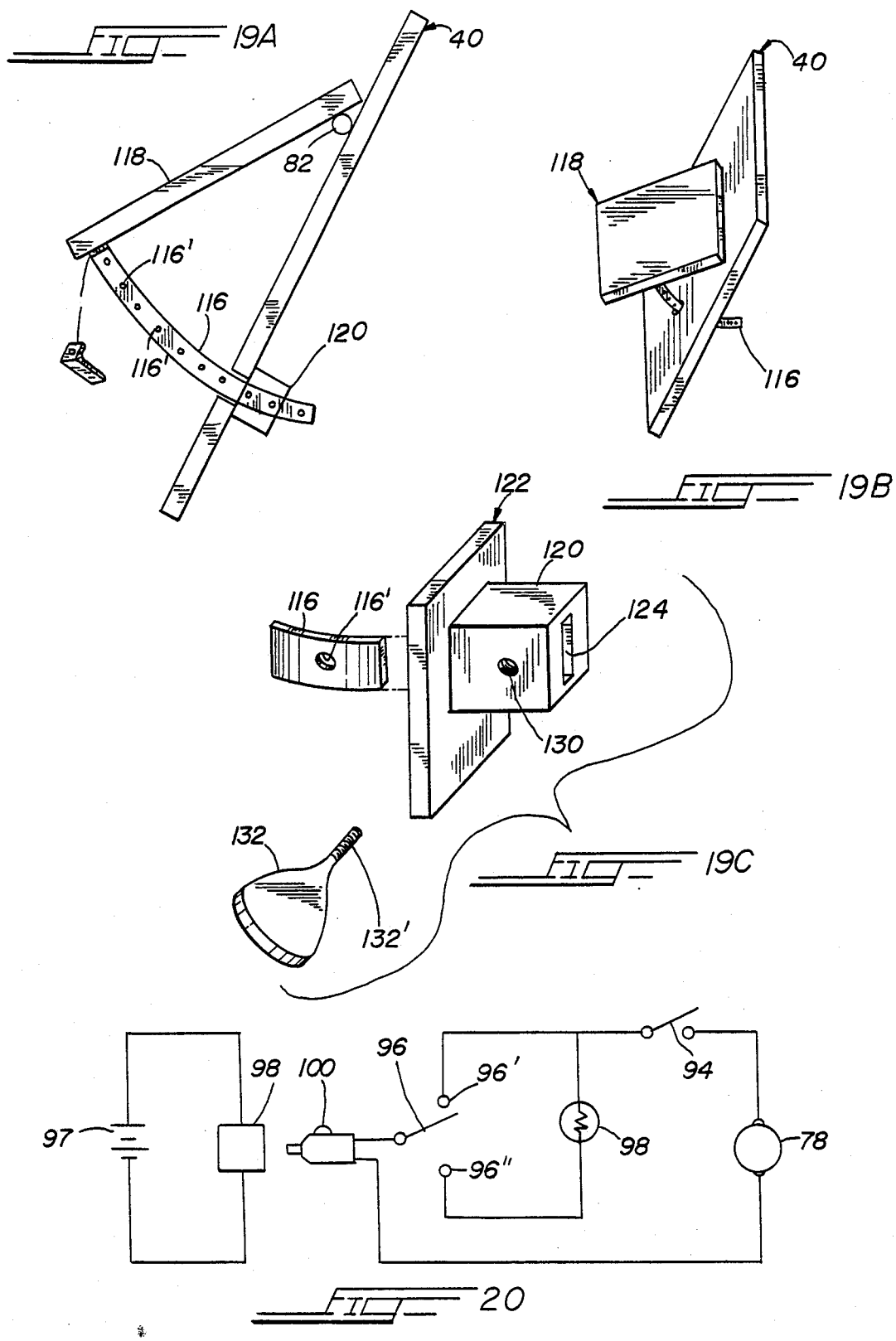

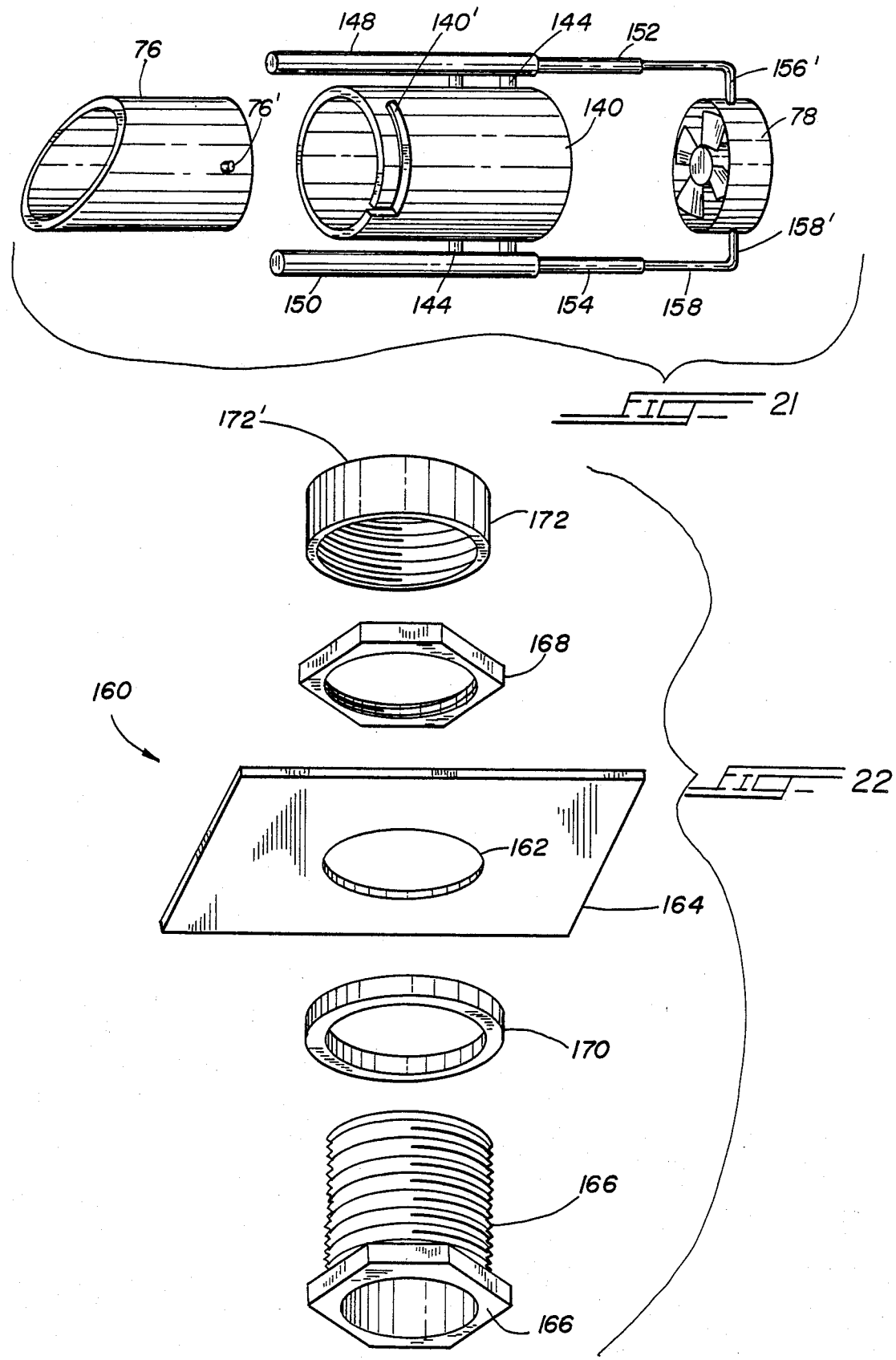

DYNAMIC VENT FOR AUTOMOBILES

BACKGROUND OF THE INVENTION

The present invention is directed to a ventilator for the window of an automobile or other motor vehicle, which ventilator is used while the vehicle is parked in order to prevent the interior of the vehicle from reaching very high temperatures. There are ventilators that are used for allowing for the interchange of air between the interior of an automobile and the ambient, in order to provide for a cooling effect via such air exchange. These prior-art ventilators are static vents in that the air exchange is allowed to be carried out without any external assistance, such static air vents relying upon the air currents created by the differences in temperature between the two air masses for the exchange of air, as well as upon air currents developed by wind and the concomitant pressure differentials associated therewith. Such static vents, however, provide only a limited degree of air exchange, and lower the interior temperature very little. The present invention is directed to a dynamic vent in which a fan or blower forces the air exchange to take place.

SUMMARY OF THE INVENTION

It is the primary objective of the present invention to provide a ventilator for the window of an automobile which is power-driven in order to enhance the air-exchange between the interior of the automobile and the surrounding air.

It is another objective of the present invention to provide a dynamic ventilator for the window of an automobile that is used in conjunction with an intake vent formed in the interior of the automobile in order to increase the flow-rate of exchange or air between the interior of the vehicle and the exterior thereof.

It is another objective of the present invention to provide a dynamic ventilator unit for the window of an automobile, and the like, which readily and facilely retrofits an existing window of the automobile to include such a power-driven window ventilator.

It is yet another objective of the present invention to provide such a window ventilator which utilizer a power-driven electric fan or blower, which may be readily and easily converted into a regular cooling fan by redirecting the orientation of the blower so that is faces interiorly, which converted cooling fan is also capable of angular adjustment in two planes, in order to direct it to the location desired in the interior of the vehicle.

It is still another objective of the present invention to allow for the power-driven unit to be powered directly from the vehicular battery via the interior lighter-outlet thereof, with such power-driven unit having an automatic shut-off when the dynamic ventilator of the invention is in its dormant, closed state.

It is still another objective of the present invention to provide such a power-driven ventilator for an automobile window which is provided with a storm shield to protect the interior of the vehicle from rain.

It is yet another objective of the present invention to provide an anti-theft screen for the dynamic ventilator of the present invention in order to prevent access to the interior of the vehicle while the ventilator is in place.

BRIEF DESCRIPTION OF THE DRAWING

The invention will be more readily understood with reference to the accompanying drawings, wherein:

FIG. 1 is a plan view of a first kind of conventional automobile window in which the dynamic ventilator of the present invention may be used;

FIG. 2 is a plan view of a second kind of conventional automobile window in which the dynamic ventilator of the present invention may be used;

FIG. 3 is a plan view of a third kind of conventional automobile window in which the dynamic ventilator of the present invention may be used;

FIG. 4A is an assembly view showing the mounting panels of the dynamic ventilator of the present invention for use with the conventional window of FIG. 1;

FIG. 11 is a plan view of a modification of the top panel of FIG. 4B in which there is provided a substantially rectilinear-shaped cutout in which may be received a conventional static window ventilator which hitherto has only been capable of use with the conventional window of FIG. 3;

FIG. 12 is a side elevational view thereof;

FIG. 13A is an isometric view showing the storm shield of the present invention for exterior mounting over the static vent mounted in the top mounting panel shown in FIG. 11;

FIG. 13B is a plan view showing the storm shield mounted to the top panel of the invention when used as a static vent;

FIG. 14 is a plan view showing a modification of the storm shield of FIG. 13;

FIG. 15A and 15B are isometric and side views, respectively, of a first type of ventilating screen positional within the storm shield of FIGS 13A or 14;

FIGS. 16A and 16B are isometric and side views, respectively, of a second type of ventilating screen positional within the storm shield of FIGS. 13A or 14;

FIG. 17E is an isometric view showing the hook-and-socket arrangement for mounting the end of the adjusting screw-shaft to the pivotal cover plate of the dynamic ventilator of FIG. 17A;

FIG. 17F is an isometric view showing the rotatably-mounted disc for the adjusting screw-shaft for allowing angular positioning thereof during the opening and closing of the cover plate of the dynamic ventilator of FIG. 17A;

FIGS. 18A–18E show a second embodiment of the dynamic ventilator of the present invention;

FIGS. 19A–19C show a third embodiment of the dynamic ventilator of the present invention;

FIG. 20 is an electrical schematic of the control circuitry for controlling the operation of the dynamic ventilator of the present invention;

FIG. 21 is an assembly view, in perspective, showing the conversion of the dynamic ventilator of the present invention to an interiorly-facing cooling fan that may be swiveled for directly cooling a person in the interior of the vehicle;

FIG. 22 is an assembly view, in perspective, showing an air-intake vent or opening formed in the vehicular body for enhancing the air exchange provided by the dynamic ventilator of the present invention;

DETAILED DESCRIPTION OF THE INVENTION

Figure 4B:
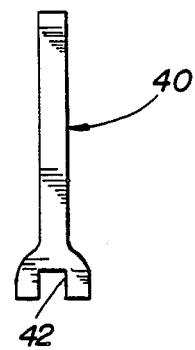
FIG. 4B is a side elevational view of the top panel thereof.
Figure 8:
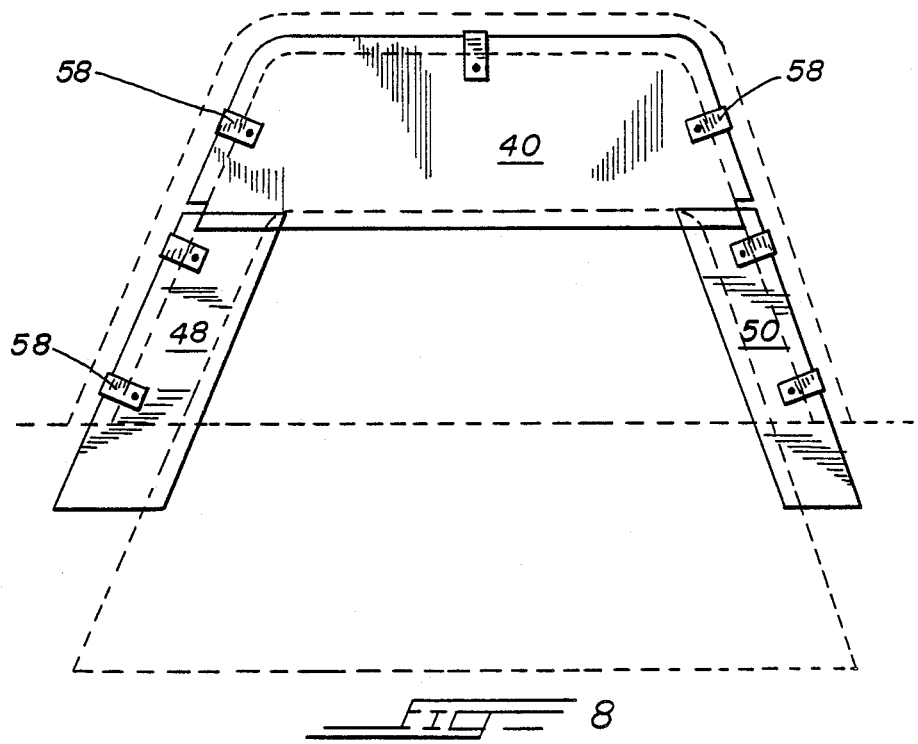
FIG. 8 is a plan view showing the mounting panels of FIG. 4A mounted in place to a conventional window of FIG. 1.

Referring now to the drawings in greater detail, FIGS. 1–3 show the three basic types of vehicular windows in current use. FIG. 1 shows a car window in which the window pane 12 recedes from the three channel-frame members 14, 16, 18 when the window pane is rolled down, the members 14, 16 being sloped and converging upwardly, just as the side edge surfaces of the window pane proper, the angle of slope of the members 14, 18 being the same as that of the side edge surfaces of the window pane proper. FIG. 2 shows a window having a window pane 20 in which a side edge surface thereof always rides within a side channel-frame member 22, but recedes from the other channel-frame members 24, 26 when the pane is rolled down. FIG. 3 shows the third type of window where the window pane 30 and the outer frame mount made up of channel-frame members 32, 34, 36 are rectilinear shaped. The present invention may be used in any of the three types of windows above-described. For illustrative purposes, the present invention will be shown designed for and in place in the type-one of window structure shown in FIG. 1, since it is most prevalent type in use today. FIG. 4A shows the three-part nature of the ventilating mounting assembly of the invention, and includes an upper or top channel-frame mounting or panel member 40, having an approximate trapezoidal shape, with the side edge surfaces thereof 40', 40" being sloped the same angle as the edges of the window pane and side frame members 14, 18. The lower edge surface of the upper member 40 includes a channel extension 42, seen also in FIG. 4B, which defines a horizontal channel in which is received the upper edge surface of the window pane 12. The thickness of the member 40 is such so as to fit within the channels formed by the structural channel-members 14, 16, 18 of the window frame, and securely held therein by means of clips described below. The mounting assembly also includes a pair of parallelogram-shaped side channel-frame mounting members 48, 50. Each side member 48, 50 is to fill the space between a respective side edge surface of the window pane 12 and the adjoining and respective channel-frame member, 14, 18 in a manner depicted in FIG. 8. The side or lateral members 48, 50 are also of a proper thickness so as to fit within the channels of the side channel-frame member 14, 18. Each side member 48, 50 defines a narrower extension 48', 50', respectively, that defines a step against which the respective side edge surface of the window pane abuts, as shown in FIG. 8. Each side member 48, 50 also has a stop member 48", 50" adjacent the lower interior face thereof for contact against the weather stripping of the window frame, in order to prevent the side members 48, 50 from sliding down the interior bottom channel of the window frame of the vehicle. When the members 40, 48, 50 are positioned in place in a vehicular window frame, the window pane may be rolled up until the entire interior space bounded by the three members 40, 48, 50 is taken up by the window pane, as shown in FIG. 8, to provide a substantially firm and relatively air-tight assembly.

Figures 5, 6, 7:
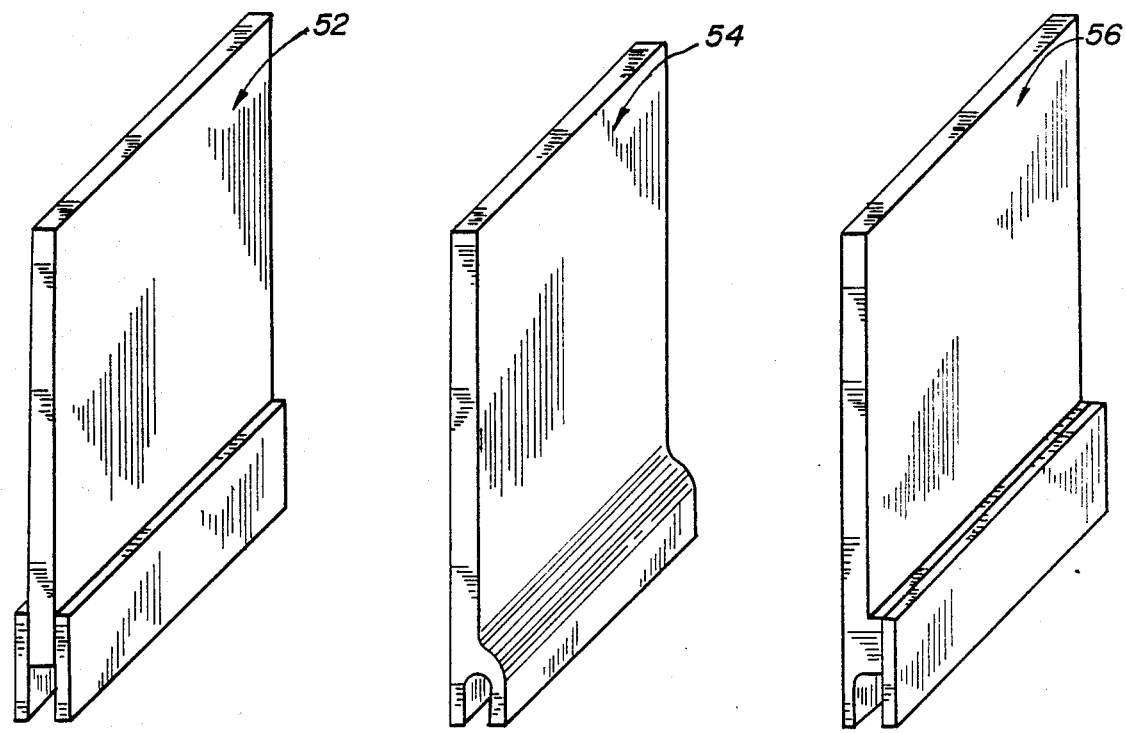
FIGS. 5, 6 and 7 are isometric views showing modifications of the top panel of FIGS. 4B.

FIGS. 5–7 show variations of the upper or top panel member, indicated by reference numerals 52, 54, and 56 respectively. Each of these is the functional equivalent of the upper panel member 40.

The members 40, 48, 50 may also be used for the type two and three windows shown in FIGS. 2 and 3, respectively. For the window of FIG. 2, the upper panel 40 and side panel 48 would be used, while for the window frame of FIG. 3, only the upper panel 40 would be used.

Figure 9:
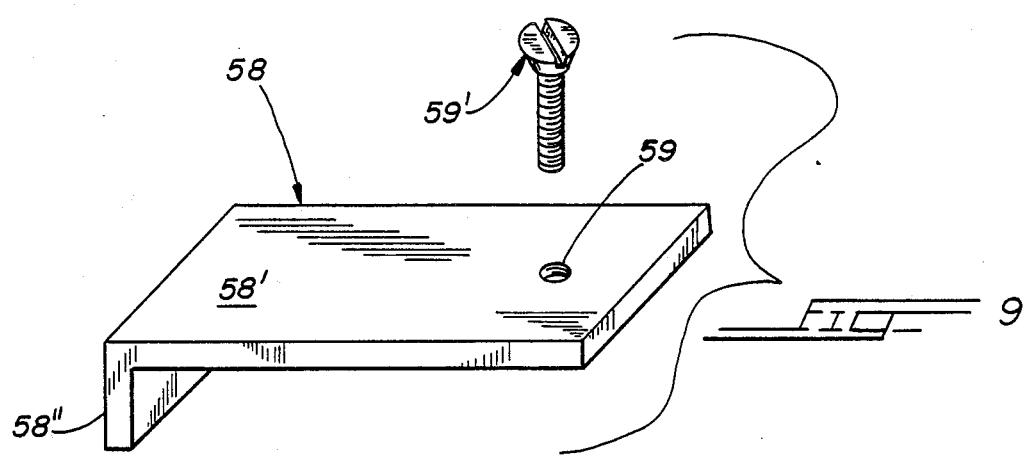
FIG. 9 is an isometric view of the mounting clip of the dynamic ventilator of the present invention for mounting the panels of FIG. 4A in the channel of the window frame so that the panels circumscribe the outer circumference of the window pane proper of the conventional window of FIG. 1.
Figure 10:
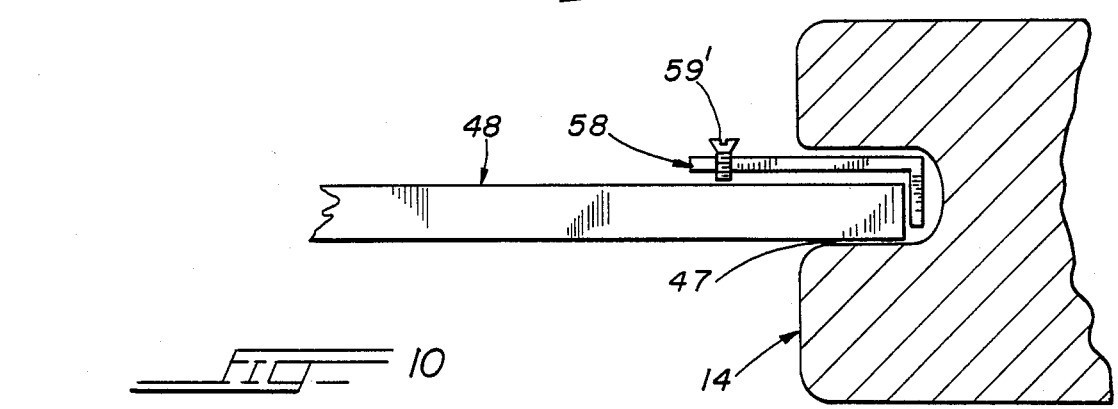
FIG. 10 is a detail view of the clip of FIG. 9 shown in place in a portion of the window-frame channel for mounting a panel therein.
Figure 17A:
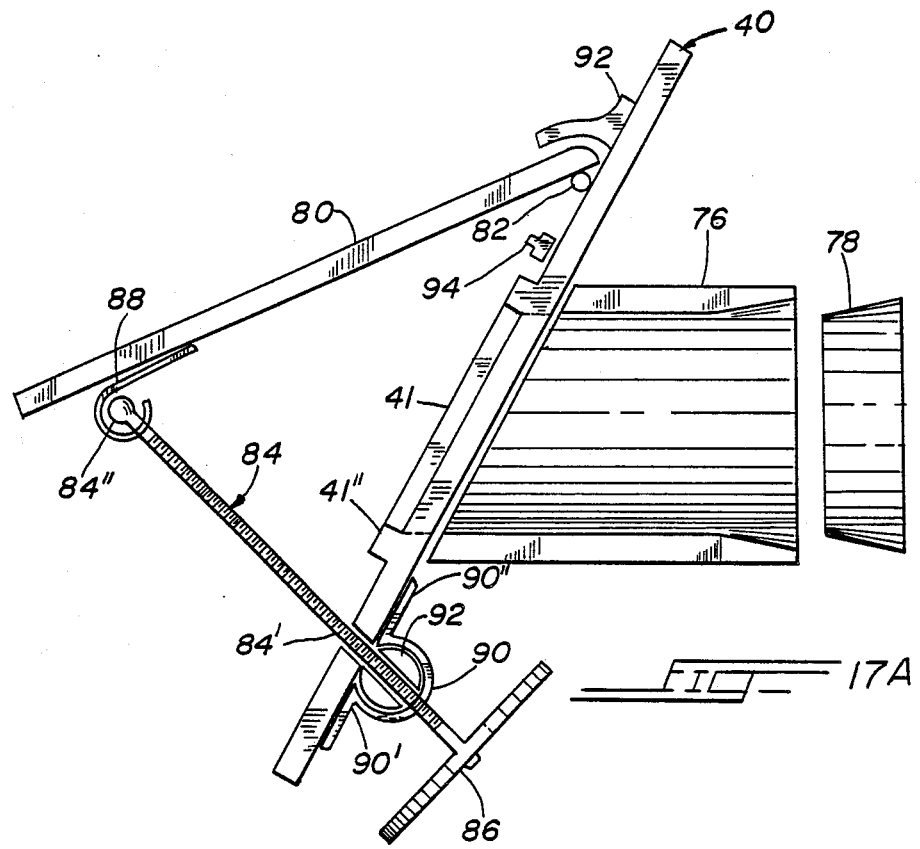
FIG. 17A is a side elevation view of the ventilator of the present invention in its capacity as a dynamic vent in which there is provided a power-assisted air exchange.
Figures 17B, 17G:
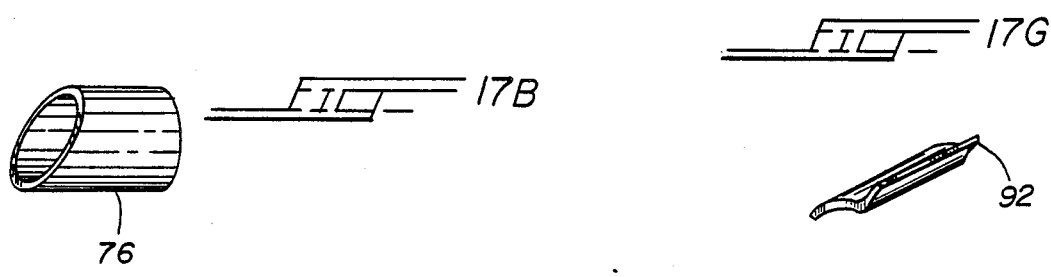
FIG. 17B is an isometric view showing the coupling sleeve of the dynamic ventilator of FIG. 17A for attaching the blower fan thereof to the window-mounting panels.
FIG. 17G is an isometric view of the upper apron of the dynamic ventilator of FIG. 17A.
Figures 17C, 17D:
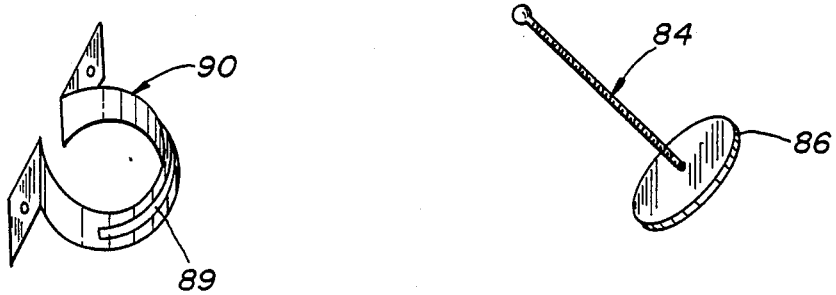
FIG. 17C is an isometric view showing the clamping ring of the adjustment mechanism for the dynamic ventilator of FIG. 17A.
FIG. 17D is an isometric view of the screw-shaft adjuster of the dynamic ventilator of FIG. 17A.

Referring to FIGS. 9 and 10, there is shown the channel-frame panel retaining clips used for firmly securing the panels 40, 48, 50 within the channels of the window frame. The clip 58 is an L-shaped bracket having a substantially rectilinear-shaped main portion 58' and a short leg 58", which leg 58" is insertable into any portion of the channels of the window frame defined by members 14, 16, 18. A respective exterior edge surface portion of the panel members 40, 48, 50 is nestled against the outwardly-facing surface of the short leg portion 58", with the exterior surface face of the respective panel member being juxtapositioned adjacent the inwardly-facing surface face of the main portion 58' of the clip. A threaded hole 59 is formed in the distal end portion of the main body portion 58', so that a screw 59' may be inserted therethrough, which screw is used for firmly positioning the respective panel member in its associated channel of the vehicular window frame, as seen in FIG. 10. By rotating the screw, the clip and panel member are relatively spaced apart in order to fill the gap of the channel of the window frame, whereby slack is taken up and the panel member firmly and fastly urged against the interior wall surface 47, for example, of the window channel-frame member 48. Thus, the mounting panel members of the invention are readily adaptable to any size of window frame. A plurality of these clips 58 are used for each panel member, as shown in FIG. 8, for mounting them to the channels of the vehicular window frame.

The top panel member 40 is used for mounting the dynamic ventilator of the invention, described below in greater detail. However, this top panel may also be used for mounting a conventional, static, vehicular window vent, for which the upper panel may be formed with a rectangular cutout 61 for an upper panel member 60, as shown in FIGS. 11 and 12. These static vents are conventional, such as those disclosed in U.S. Pat. Nos. 3,659,516; 2,949,842; 2,715,866; 2,557,442; and 1,967,504. In conjunction with use of the upper panel 40 or 60 as a static vent, a storm shield 62 is provided to prevent rain from entering the interior of the vehicle. The storm shield 62 is shown in FIGS. 13A and 13B, and includes a vertical portion 62' and an upper horizontal portion 62''. Each portion 62', 62'' is provided with an attaching skirt 64, 66 for attaching the shield to the upper panel 40 or 60, in a manner depicted in FIG. 13B. The skirts 64 may alternatively be secured to the lower portions of the side panel members 48, 50 when the shield 62 is made to cover the entire height of the window, and are secured by screws passing through threaded holes formed therein, as clearly shown. The vertical portion 62' is also preferably provided with a rectangular-shaped cutout 68 for a secondary screen 70 for increasing the air circulation while the storm shield is in place. The screen 70 is slidably received within interior wall of the vertical portion 62' via interior reinforcing wall 72 defining a screen-receiving channel defined by mutually-facing, inturned, longitudinal edges 72', 72''. The screen 70 may take on various shapes and configurations, such as those shown in FIGS. 15A, 15B and FIGS. 16A, 16B, referred to respectively, by reference numerals 70-', 70'', for enhancing the exchange of air. FIG. 14 shows another embodiment of the storm shield 75. The storm shield 75 is for use with the type of window of FIG. 2, and functions in the same manner as that described for the storm shield 62. The shield 75 includes the additional, angled section 75' to match the type two window. It is also noted that the storm shield 75 will cover up that portion of the upper panel 40 not contacting the window channel-frame member when the upper panel member 40 is used, owing to the difference in slope between the side edge surface of the panel 40 and the vertical oriented side edge of the window frame of FIG. 2. However, it is within the scope of purview of the present invention to also allow for the upper panel 40 to be cut away so as to have one vertical side edge surface extending perpendicularly to the lower horizontal channel member 42. Alternatively, the upper panel may come in two parts, one part for fitting the type-two window when used alone, with the other part being detachably securable to the vertical edge of the first part, which other part is shaped as a right-angle triangle. In addition, in order for the very same upper panel set to fit the type three window exactly, a third part may be provided also of a right-angle triangle shape, so that the first section or part would be rectangularly shaped. The separate parts may be detachably secured together by any well-known means, such as screws and brackets.

Referring now to FIGS. 17A to 17G, there is shown the dynamic ventilator of the invention, all the parts of which are directly mounted to the upper or top panel member 40. The top panel member 40 is provided with a circular cutout 41, which cutout may be located at the bottom portion of the upper panel 40 when such upper panel 40 is also provided with the static vent opening 61, or, if there is no static vent opening, such circular cutout 41 may be provided centrally of the panel 40, which cutout is typically between a one and four inch radius. Fixedly attached at one end to the rim of the cutout 41 is a hollow, cylindrical air-guide tube 76 (FIG. 17B), at the other end of which is telescopingly received the cylindrical housing 78 of a d.c. fan or blower. The end of the tube 76 receiving the housing 78 is canted to allow for a force-fit thereof, which may also allow for easy disassembly if the fan or blower is to be used for direct cooling of a person, as described below, the forward-facing outer circumference of the housing 78 also being similarly canted to provide such a force-fit. It is noted that the cutout 41 may be provided with a raised lip or rim 41' for added structural integrity. The thus-assembled fan constitutes a dynamic ventilator by forcing the interior air exteriorly thereof. When the dynamic vent is used in conjunction with the static vent, the exchange of air occurs such that the interior air exits through the fan or blower, while the ambient air enters through the static vent. If no static vent is used or provided, then ambient air may enter the interior vehicular compartment by normal means, or through a specially-provided intake vent formed in the floor of the vehicle, described below in greater detail. The dynamic vent is also provided with a pivotal closure cover plate 80 for alternatively closing off or opening up the vent to the outside air. The cover plate 80 is pivotal about a pair of hinges 82 at the top of the exterior surface of the top panel 40. A mechanism is also provided for adjustably retaining the cover plate 80 is a desired pivoted state. This mechanism includes a threaded screw 84, the shaft of which passes through a small hole 84' formed in a lower section of the panel 40. The interior end of the screw is provided with an enlarged, serrated disc or knob 86 for allowing easy rotation of the screw by a hand for fine adjustment of the plate 80. The exterior end 84'' of the screw is formed into a sphere, which sphere operatively couples the end of the screw to a socket 88, the socket 88 having an interior-facing arcuate slot 88' (FIG. 17E) allowing for the passage of the shaft of the screw 84 therethrough, as clearly shown in FIG. 17A. The end 84'' of the screw adjacent the sphere is unthreaded, with the sphere partially filling the interior volume of the socket 88, which end 84'' rides in the arcuate slot 88'. The socket 88 is screwed to the plate via a hole 87. The interior end portion of the screw shaft passes through an arcuate slot 89 (FIG. 17C) of a clamping ring 90 having a pair of lateral flanges 90', 90''' affixed to the interior wall surface of the lower section of the panel 40. The ring 90 defines a substantially cylindrically or disc-shaped interior volume in which is freely rotatably a mounting disc 92. The disc 92 is free to rotate in a vertical plane, and defines a central threaded passageway or bore 92' (FIG. 17F) through which passes the shank of the screw, as clearly shown in FIG. 17A. It may, therefore, be seen that as the screw is rotated via knob 86, the screw will translate in one direction or the other, thereby carrying with it the socket 88, and, therefore, the lower end of the cover plate 80, to thereby pivot the plate about the hinges 82 until the desired setting is achieved. The rotatable disc 92 in combination with the slot 89 allows for the angular repositioning of the interior end of screw 84 for all pivotal positions of the cover plate, the opening 84' being of sufficient radius so as to allow for such angular repositioning, while the slot 88' allows for angular repositioning at the exterior end thereof. Also provided is an apron 92 (FIG. 17G) mounted to a top, exterior portion of the panel 40, for added protection against rain. A pressure or button switch 94 is also provided on the upper exterior portion of the panel 40, adjacently juxtapositioned below the hinges 82, and midway therebetween, for detecting the closed or open state of the cover plate 80, such that, in the closed state, the switch 94 is opened to disconnect the d.c. power supply to the fan 78, while in the opened state of the cover 80, automatically connecting the power supply to the fan, so that operation of the adjusting screw 84 automatically controls the state of energization of the fan. The electrical control of the fan is shown in FIG. 20. The pressure switch 94 is connected in series with the fan 78 and a SPDT switch serving as mode control, with the first contact 96' constituting "on", the middle position constituting "off", and the second contact 96'' constituting "automatic temperature control" mode, where operations of the fan is governed by a SPST thermal switch 98, such as Elmwood 3601, which will control operation of the fan depending upon the temperature in the interior of the vehicle. Power is derived from the d.c. battery source 97 of the vehicle via the cigarette lighter 98 thereof by means of conventional adapter 100. The switch 96 is mounted on the dashboard of the vehicle, or some other convenient location.

FIGS. 18A to 18E show a second embodiment of the cover plate adjusting mechanism. The cover plate 102 is provided with a freely-rotatable disc 104 (FIG. 18C) in a hollow cavity formed in the lower section of the cover plate. The disc has a threaded passageway therethrough which passes an end of an adjusting screw 106. The disc 104 is secured in place by a pair of clamps 108, 110, each having an arcuate slot for the extension therethrough of the exterior end portion of the screw, which arcuate slots allow for angular repositioning of the exterior end of the screw. The interior end of the screw 106 is affixed to a narrow shaft 112 to which is secured a knob 106' for rotating the screw. A fastening plate 114 (FIG. 18E) is fastened to the lower interior surface of the panel 40, which plate 114 has a linear slot formed therein that allows passage of the shaft 112, as clearly shown in FIG. 18A.

FIGS. 19A to 19C show a third embodiment of the adjusting mechanism, where there is provided an arcuate track 116 fixedly attached at its exterior end to the lower interior surface of the cover plate 118. The interior end of the track is slidable in a block assembly 120 (FIG. 19C) affixed to the lower interior surface of the panel 40 via mounting plate 122. The block 120 has a channel 124 formed therethrough, which channel cooperates with aligned cutouts in the mounting plate 122 and panel 40, so that the interior end portion of the track 116 may extend therethrough, as clearly shown. The block 120 also has a threaded hole 130 intersecting the channel 124, into which hole 130 is threaded a thumb screw 132. The arcuate track 116 is provided with a series of holes 116' into which the screw shank 132' of the thumb screw may enter for retaining the track in a desired position trough one of the series of holes 116', in order to vary the angular position of the cover plate 118 about hinges 82.

As described above, the fan or blower 78 of the invention is intended to be used also for cooling a person or persons in the interior of the vehicle. Toward this end, the dynamic vent of the invention is provided with a swivel-adapter structure that allows for the swiveling of the fan, as shown in FIG. 21, which swiveling is accomplished in two planes of rotation. The adapter-structure includes an air-duct adapter connector 140 having a diametric extension greater than that of either the air guide 76 or fan housing 78. The guide tube 76 is telescopingly received in the exterior-facing end of the connector 140, with the guide tube 76 having an outwardly projecting coupling pin 76' that slides in L-shaped slot 140' of the connector 140, whereby by relatively rotating the two parts, the pin is forced against the closed end of the slot 140', to achieve a fast coupling therebetween. Affixed to the outer circumference of the connector 140, as by concentric mounting rings 144, are a pair of parallel, elongated hollow rods 148, 150. Each rod 148,150 has an inner hollow rod 152, 154, respectively, slidable therein for adjusting the overall length of the combined rods 148–152 or 150–154. Telescopingly received within the interior-facing open ends of the rods 152, 154 are a pair of L-shaped shafts 156, 158, respectively, which mount the fan 78 between its interior ends 156', 158' which are received in appropriate formed and located openings in the outer circumference of the fan housing 78. The fan housing is removably secured to the L-shaped shafts 156, 158, so that the entire adapter-structure may be used only when needed for cooling persons in the interior of the vehicle. The telescoping nature of the adapter-structure allows for the fore-and-aft adjustment of the fan 78 with respect to the window, so that the fan may be brought nearer or moved farther away from a person. If desired, thumb screws may be provided for securing the relative positions of the rods and shafts in place through appropriately-formed holes in the rods. The ends 156', 158' mount the fan 78 for rotation or swiveling in a vertical plane when viewing FIG. 21, so that the most effective angle may be achieved for cooling purposes. In addition, the pin-slot coupling 76'-140' also allows for the fan 78 with attached adapter structure to be rotated about a horizontal axis by relative movement between the pin 76' and slot 140', so that all areas of the interior of the vehicle may be accessed with a cooling breeze.

Figure 23:
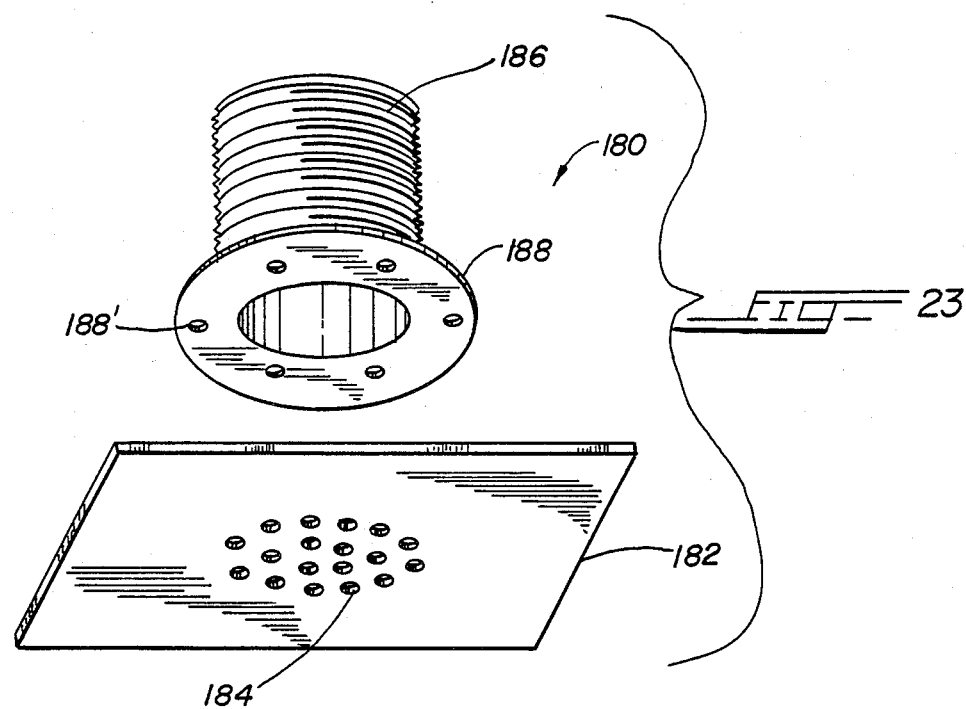
FIG. 23 is an assembly view, in perspective, showing a second embodiment of an air-intake vent or opening formed in the vehicular body for enhancing the air exchange provided by the dynamic ventilator of the present invention.

As mentioned above, when the dynamic ventilator of the invention is used without a static vent in combination therewith, it is preferable to provide an intake vent or hole in the floor of the vehicle in order to aid in the air exchange. FIG. 22 shows such an air-intake structure 160. A three-fourth inch through-hole 162 is first drilled in the floor 164 of the vehicle, such as underneath the front passenger seat. An exteriorly threaded, hollow bushing 166 is inserted through the hole 162, and drawn and held tightly thereagainst at the enlarged head 166' thereof via nut 168 on the interior side of the floor 164, with washer 170 of the exterior side of the floor. The interiorly-projecting end of the bushing 166 is then covered via an interiorly-threaded, hollow sleeve 172, which sleeve 172 has an interior-facing end 172' by a screen to prevent the entry of insects into the vehicle. When the dynamic vent is not in operation, it is desirable to close off the intake hole by means of a sleeve similar to sleeve 172 but having a closed lid instead of a screen at the end 172'. FIG. 23 shows an other embodiment of the air intake hole or vent 180 in which the vehicular floor 182 is provided with a plurality of small drilled holes 184, with an exteriorly-threaded hollow bushing 196 being placed thereagainst on the interior side of the floor via the enlarged flanged head portion 188 thereof, by means of screws passing through peripherally spaced apart holes 188', the bushing being closed off or screened off as in the embodiment of FIG. 22.

Figure 24A:
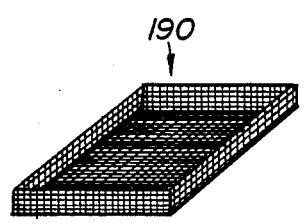
FIG. 24A is an isometric view showing an anti-theft screen of the present invention for interior mounting to prevent access to the interior of the vehicle.
Figure 24B:
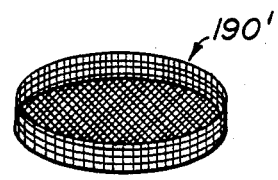
FIG. 24B is an isometric view showing a second embodiment of an anti-theft screen of the present invention for interior mounting to prevent access to the interior of the vehicle.
Figure 25:
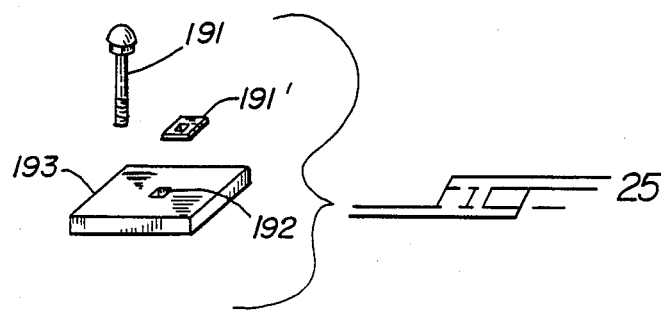
FIG. 25 is an assembly view showing the manner of securement of the anti-theft screen of FIGS. 25A and 25B to the top mounting panel of the present invention.

FIGS. 24A and 24B show an anti-theft, entry-preventive screen or mesh 190, 190', respectively, which is mounted in the interior side of the dynamic ventilator structure to the upper panel member 40. The screen or mesh 190, 190' is made of coarse steel wire mesh having openings preferably less than approximately one-fourth inch. The anti-tampering screen 190, 190' is secured to the interior wall surface of the upper panel 40 via square-neck bolts 191 passing through square-shaped holes 192 formed in a section 193 of the upper panel 40, as seen in FIG. 25. Preferably, four such holes and bolts are provided, one at each corner of the upper panel 40.

While a specific embodiment of the invention has been shown and described, it is to be understood that numerous changes and modifications may be made therein without departing from the scope, spirit and intent of the invention as set forth in the appended claims.

What I claim is:

1. A ventilator for a vehicle for mounting in a window of the vehicle, comprising, in combination:

at least one mounting panel for placement in the channel of a vehicular window frame, said at least one mounting panel having at least one opening formed through a portion thereof, said at least one mounting panel defining an interior surface and an exterior surface;

a d.c. powered fan comprising a housing for operative fluid communication with said at least one opening of said at least one mounting panel, said fan having a length taken in the direction from exteriorly to interiorly;

means securing said fan to said mounting panel for juxtaposition and alignment with said opening, said means for securing said fan to said panel so that at least part of said fan projects inwardly and away from said interior surface of said panel; and means for electrically coupling said fan to a source of d.c. power, whereby said fan causes the exchange of air between the interior of a vehicle and the ambient air;

said at least one mounting panel having a thickness less than said length of said housing.

2. The ventilator according to claim 1, wherein said means for securing comprises a hollow member having a first end attached to said mounting panel such that the hollow interior thereof is in alignment with said opening, and a second end attached to said fan such that said fan is alignment with said hollow interior of said hollow member.

3. The ventilator according to claim 2, wherein said second end comprises an inner, frustro-conical wall, and said fan comprises an outer housing having an end defining an outer, frustro-conical wall for mating engagement in said inner, frustro-conical wall of said second end of said hollow member, whereby said fan is force-fitted therein for detachable securement.

4. The ventilator according to claim 1, further comprising a pivotal closure plate pivotally connected to said exterior surface of said mounting panel for alternatively closing off and exposing said opening of said mounting panel to the ambient air, said mounting panel comprising means for pivotally mounting said closure plate at an upper section thereof above said opening of said mounting panel.

5. The ventilator according to claim 4, further comprising means for adjustably positioning said closure plate at a desired angular position with respect to said mounting panel in order to adjust the exposure of said opening, said means for adjustably positioning causing the selected rotation of said closure plate about said means for pivotally mounting.

6. The ventilator according to claim 5, wherein said means for adjustably mounting comprises a screw having a shank, said mounting panel having a hole formed in a lower section thereof below said opening thereof, said shank passing through said hole; said screw having a first end portion positioned interiorly of said interior surface, and a second end portion operatively coupled to a lower section of said closure plate; and means for threadingly mounting one of said first and second end portions for rotation and translation therein, whereby upon the rotation of said screw, said screw translates to pivot said closure plate.

7. The ventilator according to claim 6, wherein one of said first and second end portions of said screw is threaded, and the other of said first and second end portions is unthreaded.

8. The ventilator according to claim 4, wherein said means for electrically coupling comprises a pressure-sensitive switch mounted to said exterior surface of said mounting panel below said means for pivotally mounting, said switch being coupled to a power source, whereby upon the opening of said closure plate, said fan is automatically energized, and upon the closing of said closure plate, said fan is automatically de-energized.

9. The ventilator according to claim 1, wherein said means for electrically coupling comprises a first control switch, and a second thermal switch in parallel with said first control switch, said second switch, when brought in-line by said first switch, automatically controlling the powering of said fan dependent upon the temperature of the interior of a vehicle; said means for electrically coupling further comprising a vehicular cigarette-lighter adapter for insertion into the cigarette lighter of a vehicle, whereby said fan is powered by the battery of the vehicle.

10. The ventilator according to claim 2, wherein said means for securing further comprises a hollow, tubular adapter having a first end and a second end, said first end thereof being coupled to said second end of said hollow member for alignment of the hollow interiors of said hollow member and said tubular adapter; said means for securing further comprising at least one rod member coupled to said tubular adapter, and means for coupling said rod member to said tubular adapter; said rod member defining an end portion projecting interiorly away from said second end of said tubular adapter, said rod member comprising means for rotatably mounting said fan for rotation in a vertical plane, whereby said fan may be rotated so as to cool a person sitting in a vehicle.

11. The ventilator according to claim 10, wherein said first end of said tubular adapter is at least partially rotatably mounted to said second end of said hollow member, so that said fan may be swiveled to a desired orientation for the most effective cooling position.

12. The ventilator according to claim 11, wherein said means for coupling said rod member to said tubular adapter comprises a hollow shaft telescopingly receiving therein said rod member for selected longitudinal positioning of said rod member and said fan in the interior of a vehicle.

13. The ventilator according to claim 1, wherein said at least one mounting panel comprises at least one edge channel for receiving therein an edge surface of a vehicular window pane.

14. The ventilator according to claim 13, comprising three said mounting panels, a first upper mounting panel, a second side mounting panel, and a third side mounting panel each said mounting panel comprising a said edge channel for receiving a respective edge surface of a vehicular window.

15. The ventilator according to claim 1, further comprising at least one clip means for mounting said mounting panel in a channel of a vehicular window frame, said clip means comprising an L-shaped bracket having a first longer leg portion for extension approximately parallel to one of said interior and exterior surfaces of said mounting panel, and a second shorter leg portion, said first leg portion having a hole formed therein, and a screw passing through said hole of said first leg portion for contact against said one surface of said mounting panel, said clip means being positioned in a channel of a vehicular window frame such that said second leg portion is fully contained therein across the width of the channel, with said first leg portion projecting outwardly from said channel such that said hole of said first leg portion is positioned exteriorly of the channel, whereby upon the turning of said screw, said clip and said mounting panel are forced relatively apart to fill the gap of the channel.

16. The ventilator according to claim 2, further comprising an anti-tampering screen for fixed attachment to said interior surface of said mounting panel, said screen defining an interior space in which is received said hollow member and said fan.

17. In a vehicle comprising a window defining a window frame having a peripheral channel in which slides the window pane of the window, the improvement comprising: a ventilator mounting structure for mounting a vehicular vent to the window thereof, said structure comprising:
- a first upper mounting panel having a lower edge surface, an upper edge, and a pair of side edges;
- a second side mounting panel having a first and a second side edge surface, and an upper and a lower edge surface;
- a third side mounting panel having a first and a second side edge surface, and an upper and a lower edge surface;
- the width of said side panels combined being less than the width of said upper panel;
- said first side edges of said side panels being received in said peripheral channel of said window frame, and said upper and side edges of said upper panel also being received in said peripheral channel;
- said side panels abutting up against said lower edge of said upper panel at the upper edge surfaces thereof, each said second side edge surface of said side panels sloping inwardly toward the other respective side panel, whereby upon the rolling up of the window pane, said window pane fits snugly in the space bounded by said lower edge of said upper panel and said second edges of said side panels;
- said upper panel having at least one opening formed therein for the placement of a vent.

18. The improvement according to claim 17, further comprising a storm shield attached to the exterior-facing surface of said upper panel for protecting the interior of the vehicle from rain.

19. The improvement according to claim 17, in combination with a dynamic ventilator, said dynamic ventilator comprising a d.c. powered fan for operative fluid communication with said at least one opening of said upper mounting panel;
- means securing said fan to said upper mounting panel for juxtaposition and alignment with said opening, said means for securing said fan to said upper mounting panel so that said fan projects inwardly and away from said interior surface of said panel; and
- means for electrically coupling said fan to a source of d.c. power, whereby said fan causes the exchange of air between the interior of the vehicle and the ambient air.

20. In a vehicle comprising a window defining a window frame having a peripheral channel in which slides the window pane of the window, the improvement comprising: at least two mounting panels for placement in the channel of the vehicular window frame, one of said at least two mounting panels having at least one opening formed through a portion thereof, each of said at least two mounting panels defining an interior surface and an exterior surface;
- a d.c. powered fan for operative fluid communication with said at least one opening of said one mounting panel; means securing said fan to said one mounting panel for juxtaposition and alignment with said opening, said means for securing said fan to said one mounting panel so that at least part of said fan projects inwardly and away from said interior surface of said one mounting panel; and
- means for electrically coupling said fan to a source of d.c. power, whereby said fan causes the exchange of air between the interior of a vehicle and the ambient air;
- said one mounting panel closing off the upper portion of said window of the vehicle, and the other of said at least two mounting panels closing off at least a lower lateral side portion of said window; said one mounting panel comprising an upper edge surface received in the upper horizontal portion of said peripheral channel of said window, and a lower edge surface; and said other mounting panel having a width less than the width of said one mounting panel and comprising a first side edge surface received in a substantially-vertical side portion of said peripheral channel of said window and an upper edge surface; said upper edge surface of said other mounting panel lying directly adjacent to and substantially parallel with said lower edge of said one mounting panel;
- said other mounting panel also having a second sloping side surface corresponding to the slope of the edge of the window pane abutting thereagainst.

* * * * *